(12) United States Patent
Hayashide et al.

(10) Patent No.: US 7,397,620 B2
(45) Date of Patent: Jul. 8, 2008

(54) IMAGE READING APPARATUS USING IMAGE READING LENS

(75) Inventors: Tadao Hayashide, Utsunomiya (JP); Takayuki Sugiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/849,787

(22) Filed: Sep. 4, 2007

(65) Prior Publication Data

US 2008/0062492 A1 Mar. 13, 2008

(30) Foreign Application Priority Data

Sep. 11, 2006 (JP) ............... 2006-245440

(51) Int. Cl.
*G02B 7/00* (2006.01)
*G02B 26/08* (2006.01)
*G02B 13/08* (2006.01)
*H04N 1/04* (2006.01)

(52) U.S. Cl. .................. 359/896; 359/207; 359/668; 358/483

(58) Field of Classification Search .......... 359/207, 359/668; 358/483
See application file for complete search history.

(56) References Cited

U.S. PATENT DOCUMENTS 6,307,661 B1 10/2001 Fujibayashi et al. ......... 359/207
6,507,444 B2 1/2003 Hayashide et al. .......... 359/720
6,801,375 B2 10/2004 Hayashide ................. 359/819
2002/0163739 A1 11/2002 Hayashide et al. .......... 359/720
2003/0002170 A1* 1/2003 Hayashide ................. 359/668
2003/0214731 A1 11/2003 Hayashide ................. 359/819

FOREIGN PATENT DOCUMENTS

JP 2000-171705 6/2000
JP 2000-307800 11/2000
JP 2004-78149 3/2004

* cited by examiner

*Primary Examiner*—James Phan
(74) *Attorney, Agent, or Firm*—Fitzpatrick, Cella, Harper & Scinto (57) ABSTRACT

An image reading apparatus with an image reading lens configured to reduce a field curvature and a magnification error in the sub-scan direction, includes a photoelectric conversion element having picture elements arrayed in the main-scan direction, and an image reading lens for imaging imagewise information on a surface of an original, upon a light receiving surface of the photoelectric conversion element, the image reading lens including at least one anamorphic lens having anamorphic surfaces formed at a light entrance surface and a light exist surface thereof, respectively, wherein, when a sectional shape of the anamorphic surface in a main-scan section which contains an optical axis of the image reading lens and the main-scan direction, is taken as a meridional, a curvature of a sagittal of the anamorphic surface defined within a plane being perpendicular to the main-scan section and containing a normal to the anamorphic surface at an arbitrary position in the meridional direction, changes continuously along the meridional direction from the optical axis.

6 Claims, 5 Drawing Sheets

IMAGE READING APPARATUS USING IMAGE READING LENS

FIELD OF THE INVENTION AND RELATED ART

This invention relates to an image reading apparatus using an image reading lens. More particularly, the invention is suitable usable for an image reading apparatus such as an image scanner, a copying machine or a facsimile machine, for example, in which the optical performance of the image reading lens having an anamorphic lens is best utilized to perform high-precision image reading.

Various proposals have been made in regard to image reading apparatuses such as image scanner or digital copying machine, for example.

Figure 10:
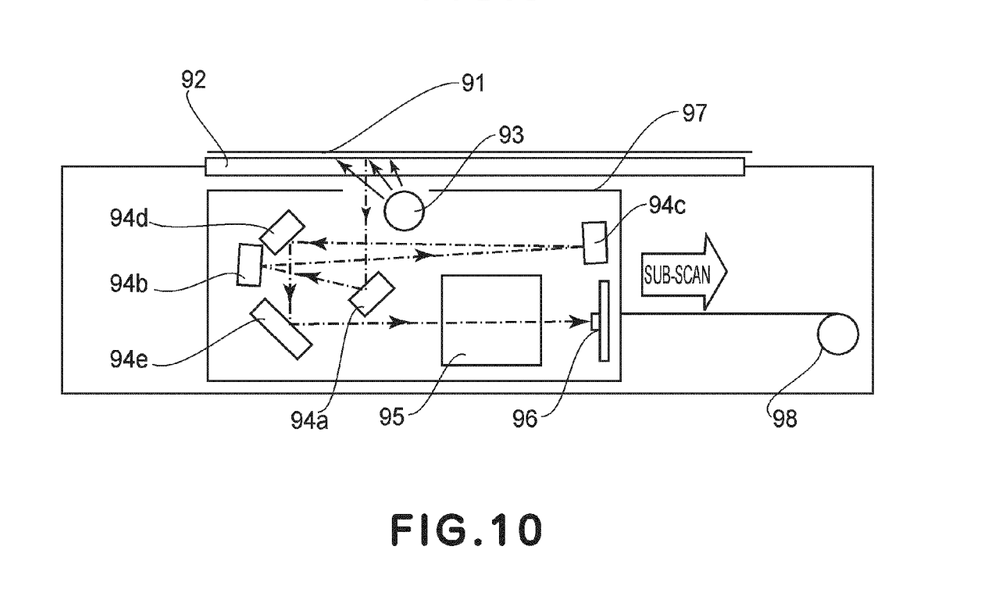
FIG. 10 is a schematic diagram of a main portion of a conventional image reading apparatus.

FIG. 10 is schematic diagram of a main portion of the structure of a conventional image reading apparatus.

In FIG. 10, denote at 92 is an original table (original table glass) on which an original 91 is placed. Denoted at 93 is an illumination system which comprises a xenon tube, halogen lamp or light emitting diode array, for example. Denoted at 94a-94e are reflecting mirrors which function to bend the light beam from the original 91, inside the carriage 97.

Denoted at 95 is an imaging optical system (image reading lens) which functions to image the light from the original 91 on the surface of reading means 96.

Denoted at 96 is a line sensor such as CCD (Charge Coupled Device), for example, as reading means, which comprises such structure that a plurality of picture elements are arrayed along the main-scan direction which is perpendicular to the sheet of the drawing.

Denoted at 97 is a carriage in which an illumination system 93, reflecting mirrors 94a-94e, an imaging lens (lens unit) 95 and reading means (CCD) 96 are accommodated integrally.

The carriage 97 is scanningly moved in the sub-scan direction as illustrated in the diagram, by means of a sub-scan mechanism 98 such as a motor, whereby imagewise information on the original 91 is read.

The imagewise information of the original 91 read thereby is sent to a personal computer or the like which is an external equipment, through an interface not illustrated.

In image reading apparatuses having such structure as described above, downsizing of the carriage 97 is indispensable to attempt downsizing of the overall system.

For downsizing the carriage 97, there are some methods: increasing the number of reflection mirrors or using a single reflection mirror in the way to perform multiple reflections, thereby to secure the optical path length.

With these methods, however, the structure inside the carriage 97 becomes complicated, and this requires a higher assembling precision. Furthermore, the overall system is upsized.

Moreover, there is an additional problem that the imaging performance deteriorates in proportion to the profile irregularity of the reflecting mirror and the reflection times, which adversely influences the image reading.

In consideration of these inconveniences, the assignee of the subject application has proposed an image reading apparatus in which an anamorphic lens having at least one surface of rotationally asymmetric shape is introduced into an imaging optical system to widen the field angle (angle of view) of the imaging optical system, to thereby shorten the object-to-image distance and to reduce the optical path length itself (see patent document Nos. 1 and 2, below).

If an anamorphic lens is used in an imaging optical system as described above, the field curvature aberration can be reduced effectively, and images of a good contrast are obtainable. However, on the other hand, the imaging magnification, particularly the imaging magnification (sub-scan magnification) in the sub-scan direction will change from the optical axis toward the peripheral portion around it. Then, in the case of image reading based on three line color sensors of R, G and B, for example, color drift (misregistration) will occur in the sub-scan direction.

In an attempt to avoiding such inconvenience, the assignee of the subject application has proposed a color image reading apparatus in which the specifications (shape) of the line sensor and the distortion aberration component of the imaging lens in the sub-scan direction are set adequately, and good color image is obtainable thereby (see Patent Document No. 3).

[Patent Documents]
1. Japanese Laid-Open Patent Application No. 2000-171705
2. Japanese Laid-Open Patent Application No. 2004-78149
3. Japanese Laid-Open Patent Application No. 2000-307800

When an anamorphic surface is used in the imaging lens, it is necessary to clarify the numerical causation concerning the shape of the anamorphic surface and the sub-scan magnification. To this end, it would be best to perform the ray tracing simulation with regard to the sub-scan magnification after the anamorphic surface is determined.

The color image reading apparatus of the patent document No. 3 is designed mainly for the image reading with a resolution of about 600 dpi, and the length of one side of a single pixel of the line sensor is around 7 to 8 μm.

As compared therewith, recent color image reading apparatuses are required to perform image reading with higher resolution. For example, with a resolution of 2400 dpi, the length of one side of a single picture element of the line sensor should be about 1.8 to 2.7 μm. Thus, about 3 to 5 times higher precision is required.

Furthermore, in addition to the resolution improvements, downsizing of the overall system and the higher picture quality are desired. Hence, it is required for the image reading lens to reduce the field curvature aberration on one hand and to widen the field angle (angle of view) on the other hand. As a result of this, it is necessary to use a lens having much stronger anamorphic characteristic. Thus, the required precision is nearing 10 times higher as compared with the past.

When these situations are taken into account, it would be necessary to completely compensate the vertical magnification at individual positions on the meridional of the anamorphic surface, namely, changes of the magnification in the sub-scan direction. However, when only one anamorphic surface is used in an attempt to reducing both the field curvature aberration and a magnification error in the sub-scan direction, there is only one degree of freedom. Therefore, it is very difficult to control these two factors independently of each other.

SUMMARY OF THE INVENTION

The present invention provides an image reading apparatus using an image reading lens by which both the field curvature aberration and the magnification error in the sub-scan direction can be well reduced.

In accordance with an aspect of the present invention, there is provided an image reading apparatus, comprising: a photoelectric conversion element having picture elements arrayed in a main-scan direction; and an image reading lens for imaging imagewise information on a surface of an original, upon a light receiving surface of said photoelectric conversion element, wherein said image reading lens includes at least one anamorphic lens having anamorphic surfaces formed at a light entrance surface and a light exist surface thereof, respectively, wherein, when a sectional shape of the anamorphic surface in a main-scan section which contains an optical axis of said image reading lens and the main-scan direction, is taken as a meridional, a curvature of a sagittal of the anamorphic surface defined within a plane being perpendicular to the main-scan section and containing a normal to the anamorphic surface at an arbitrary position in the meridional direction, changes continuously along the meridional direction from the optical axis, wherein, when N is a refractive index of a material of the anamorphic lens, $r_{in}$ is a curvature radius of the sagittal at a position where a principal ray passes through the light entrance surface of the anamorphic lens, $r_{out}$ is a curvature radius of the sagittal in a direction perpendicular to the main-scan section and at a position where the principal ray passes through the light exit surface of the anamorphic lens, d is a distance in the optical axis direction between the positions where the principal ray passes the light entrance surface and the light exit surface of the anamorphic lens, respectively, ω is a largest half field angle of said image reading lens, and when constants A and B expressed by $$A = \frac{N-1}{r_{in}}\left(1 - \frac{1}{r_{out}}\left(r_{in} - \frac{d(N-1)}{N}\right)\right)$$

$$B = 1 - \frac{d(N-1)}{Nr_{in}}$$

are used, then conditions expressed by $$0.8 < \frac{A_{off}}{A_{on}\cos\omega} < 1.2$$

$$\left|1 - \frac{A_{off}}{A_{on}\cos\omega}\right| + \left|1 - \frac{B_{off}}{B_{on}\cos\omega}\right| < 0.2$$

are satisfied, where $A_{on}$ and $B_{on}$ are values of the constants A and B concerning a principal ray of abaxial light, respectively, and $A_{off}$ and $B_{off}$ are values of the constants A and B concerning a principal ray of most abaxial light, respectively.

In one preferred form of this aspect of the present invention, when $A_{mid}$ is a value of the constant A concerning a principal ray of 70% filed-angle light with respect to the most abaxial light, a relation $$0 < \frac{7A_{on} + 3A_{off} - 10A_{mid}}{10|A_{on}|} < 0.4$$

is satisfied.

In one preferred form of this aspect of the present invention, when $R_{in}$ is a curvature radius of the meridional at the position where the principal ray passes through the light entrance surface of the anamorphic lens, $R_{out}$ is a curvature radius of the meridional at the position where the principal ray passes through the light exit surface of the anamorphic lens, a constant C expressed by $$C = \frac{N-1}{R_{in}}\left(1 - \frac{1}{R_{out}}\left(R_{in} - \frac{d(N-1)}{N}\right)\right)$$

is used, and when $C_{on}$, $C_{mid}$ and $C_{off}$ are values concerning principal rays of the axial light, 70% field-angle light and most abaxial light, respectively, a relation $$0.1 < \frac{7C_{on} + 3C_{off} - 10C_{mid}}{10(C_{off} - C_{on})} < 0.7$$

is satisfied.

The curvature radius of the meridional and the curvature radius of the sagittal of said image reading lens, on the optical axis of said image reading lens, may be made equal to each other.

The image reading lens may include, in an order from the surface of the original to the photoelectric conversion element side, a first lens of positive refracting power having a meniscus shape with a convex surface facing the original side, a second lens with biconcave lens surfaces, a third lens with biconvex lens surfaces, and a fourth lens having a meniscus shape with a convex surface facing the photoelectric conversion element side, wherein said fourth lens may be the anamorphic lens.

The image reading lens may have a vignetting factor which is not less than 95% over the whole field angle.

Briefly, in accordance with the present invention, an image reading apparatus using an image reading lens by which both the field curvature aberration and the magnification error in the sub-scan direction can be well reduced, is accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Figure 1:
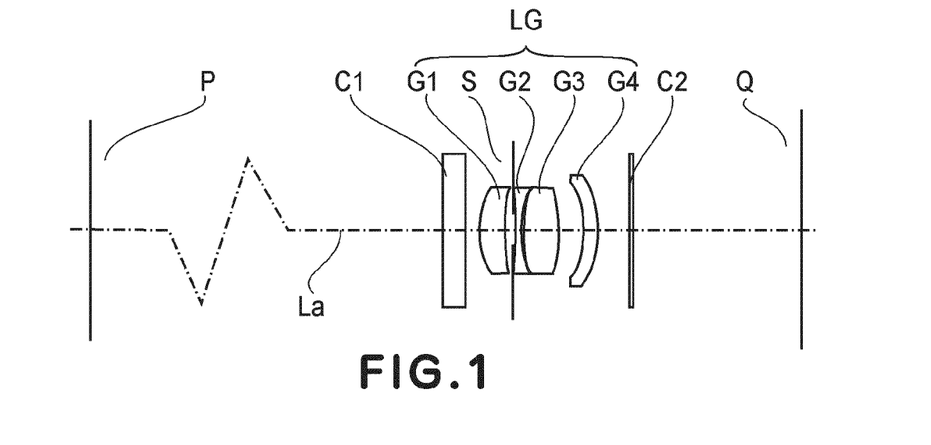
FIG. 1 is a lens sectional view according to Numerical Example 1 of the present invention.
Figure 2:
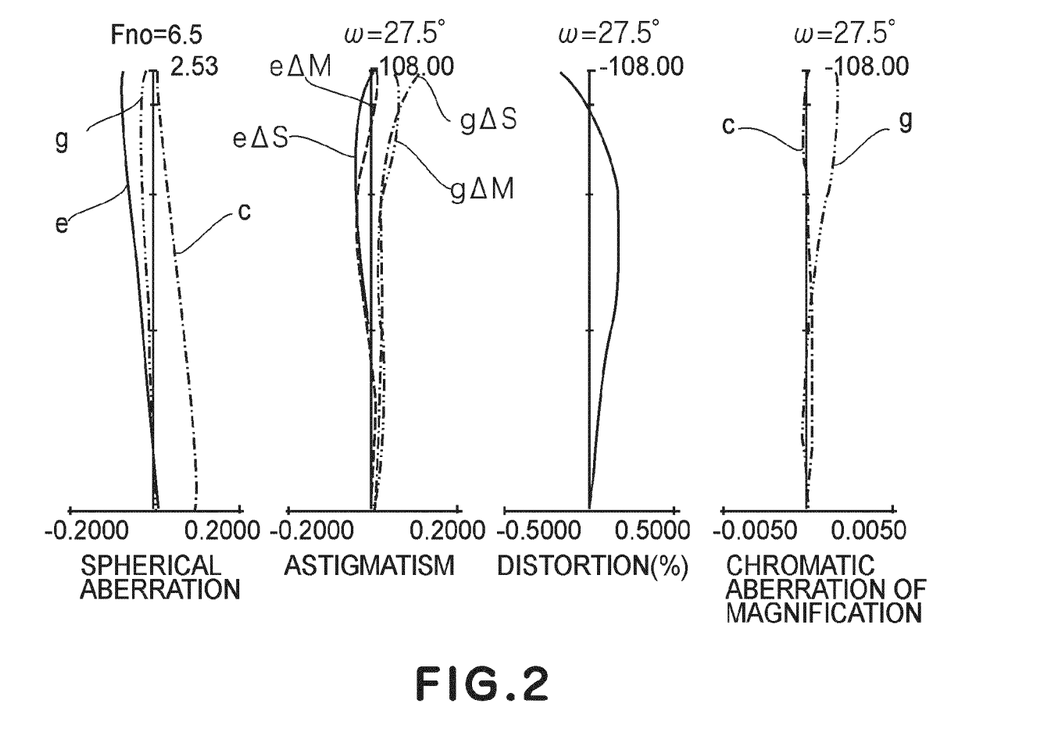
FIG. 2 is an aberration diagram according to Numerical Example 1 of the present invention.
Figure 3:
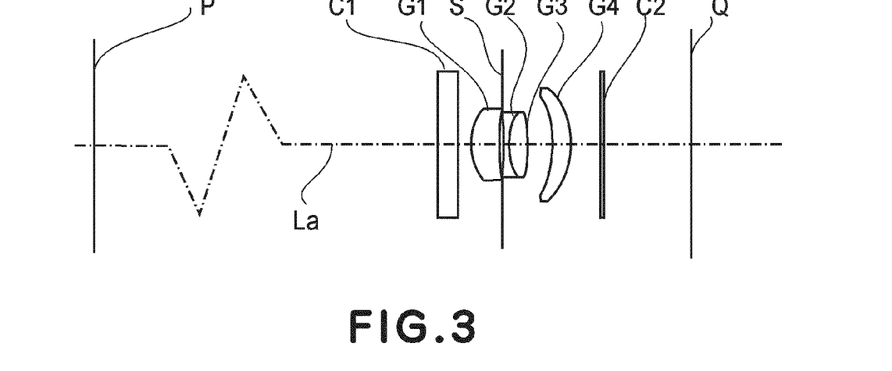
FIG. 3 is a lens sectional view according to Numerical Example 2 of the present invention.
Figure 4:
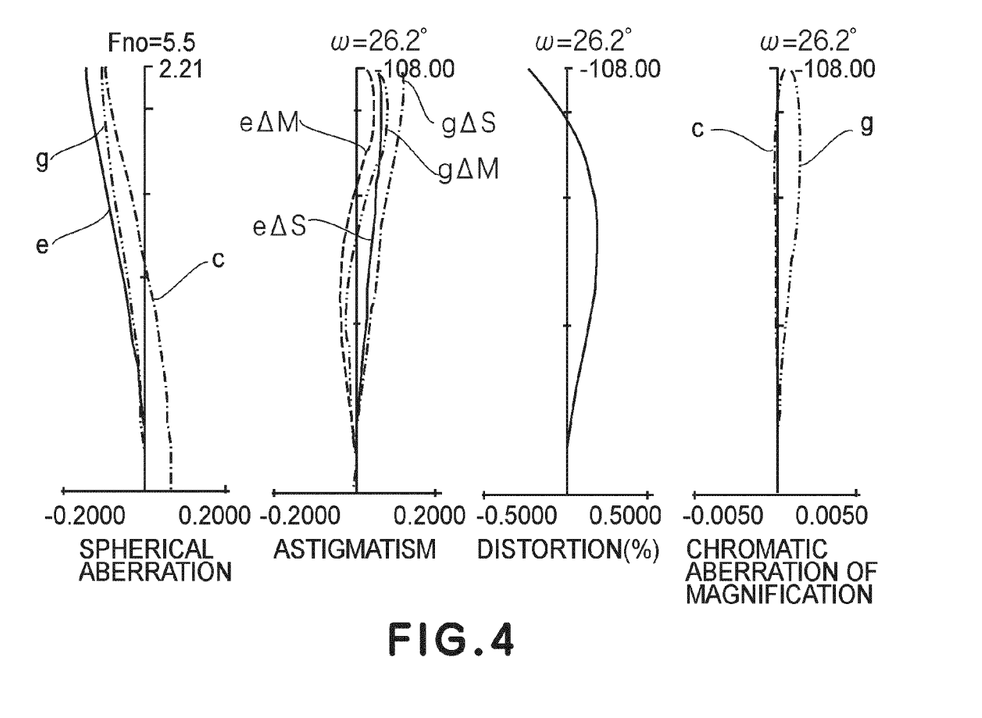
FIG. 4 is an aberration diagram according to Numerical Example 2 of the present invention.
Figure 5:
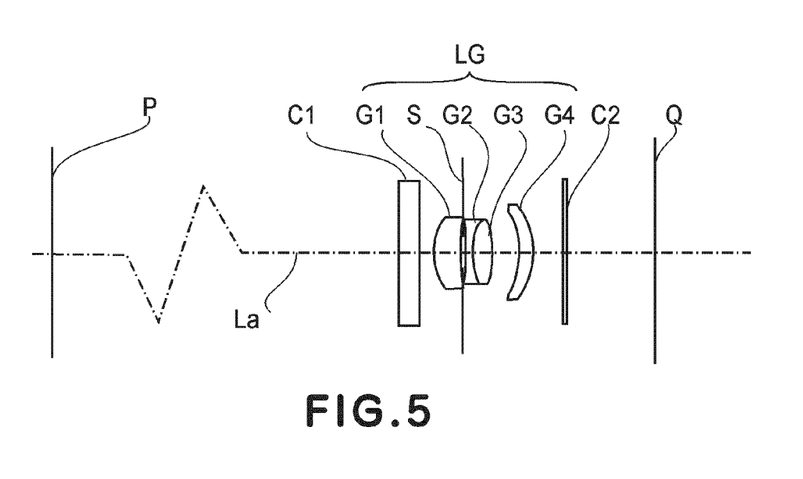
FIG. 5 is a lens sectional view according to Numerical Example 3 of the present invention.
Figure 6:
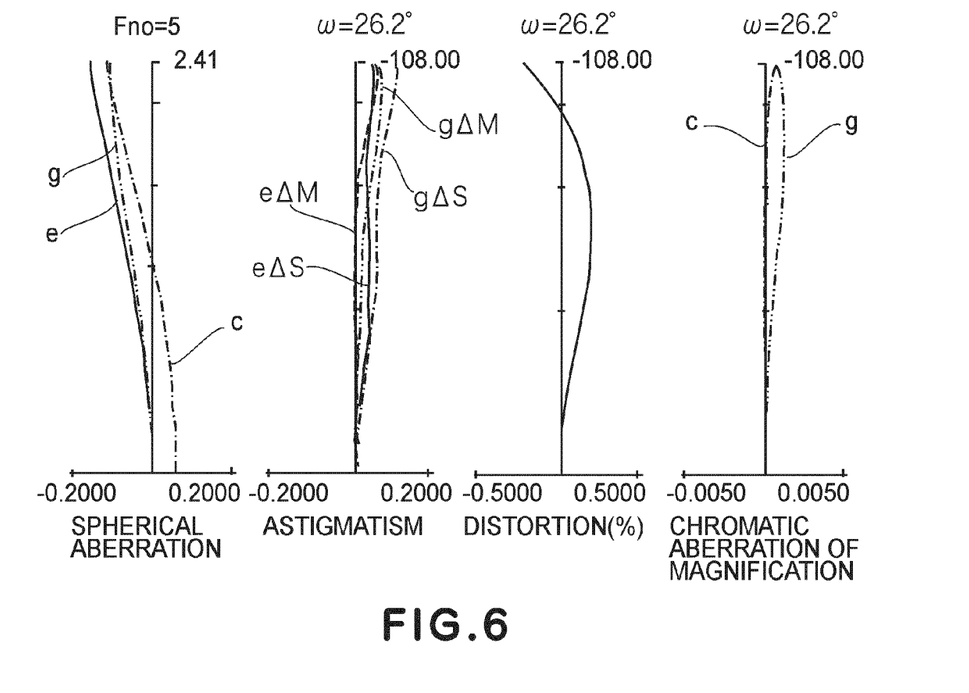
FIG. 6 is an aberration diagram according to Numerical Example 3 of the present invention.

FIG. 1, FIG. 3 and FIG. 5 are lens sectional views, respectively, based on Numerical Examples 1, 2 and 3 of an image reading lens according to the present invention. FIG. 2, FIG. 4 and FIG. 6 are aberration diagrams, respectively, illustrating spherical aberration, astigmatism, distortion and chromatic aberration of magnification in Numerical Examples 1, 2 and 3 of the image reading lens according to the present invention.

Figure 7:
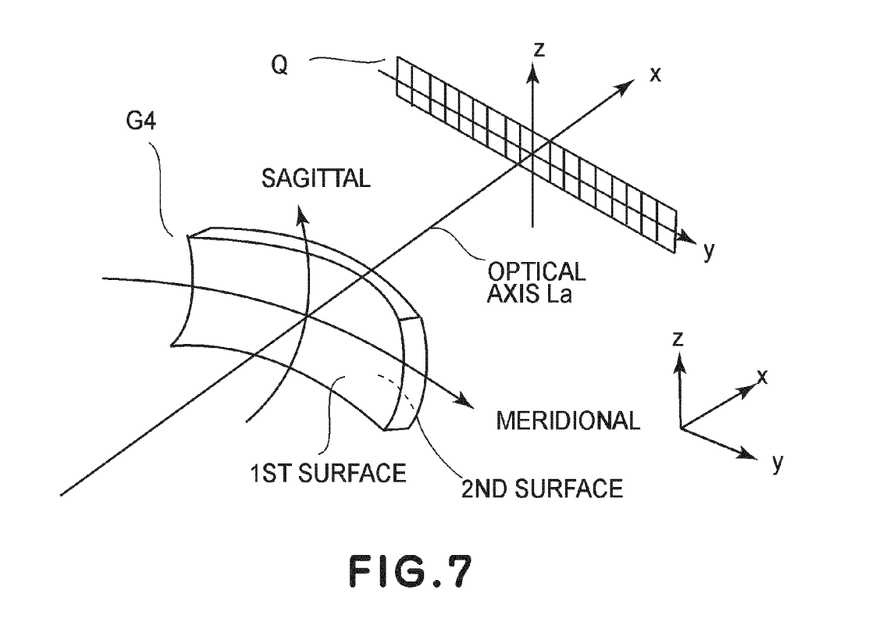
FIG. 7 is a perspective view for explaining the relationship between the fourth lens and a CCD.

FIG. 7 is a perspective view for explaining the relationship between a fourth lens G4 constituting one element of an image reading lens of the present invention and a photoelectric conversion element Q.

In the lens sectional views of FIG. 1, FIG. 3 and FIG. 5, the left-hand side is the enlargement side (longer conjugate point) corresponding to the original surface P side (where the image to be read is present). The right-hand side is a reduction side (shorter conjugate point) corresponding to the side where the photoelectric conversion element (CCD) Q is provided.

Denoted in the drawings at LG is an image reading lens (imaging optical system) for imaging the imagewise information on the original surface, upon the light receiving surface of the photoelectric conversion element. Denoted at P is an original (original surface) as an object. Imagewise information to be read is present on that surface. Denoted at Q is the image plane on which a photoelectric conversion element (CCD) having picture elements arrayed in a one dimensional direction is provided. In addition to these, image pickup means such as a two-dimensional CCD or a photosensitive surface may be disposed there. Denoted at C1 is a contact glass, and denoted at C2 is a cover glass.

The image reading lens LG serves to image, in a reduced scale, the imagewise information on the original surface P upon the photoelectric conversion element Q. The imagewise information is read by the photoelectric conversion element Q. The image reading lens LG of the present embodiment has a vignetting factor (aperture efficiency) of 95% or more in the whole field angle.

The image reading lens LG of FIG. 1, FIG. 3 and FIG. 5 comprises the following lenses, in an order from the original surface side P to the photoelectric conversion element side Q:

a first lens G1 of positive refracting power (hereinafter, simply "positive") having a meniscus shape with a convex surface facing the original surface side P;
a stop S;
a second lens G2 with biconcave lens surfaces;
a third lens G3 Of with biconvex lens surfaces; and
a fourth lens G4 of meniscus shape with a convex surface facing the photoelectric conversion element side Q.

A telephoto type lens is constituted by these four lenses.

The light entrance surface (first surface) and the light exit surface (second surface) of the fourth lens G4 are defined by an anamorphic surface.

Here, as shown in FIG. 7, the meridional is defined as the cross-sectional shape in the main-scan section (x-y section) that contains the optical axis La (x direction) defined by the first lens G1 to the third lens G3, comprising rotationally symmetric surfaces, and the array direction (main-scan direction) of the picture elements of the photoelectric conversion element Q.

In the anamorphic surface, the curvature of the meridional in the main-scan section and the curvature of the sagittal in the direction (sub-scan direction, z direction or sagittal direction) perpendicular to the main-scan section, both on the optical axis La, are equal to each other. Furthermore, the curvature of the anamorphic surface in the direction perpendicular to the main-scan section changes continuously along the meridional direction (y direction) from the optical axis La.

In the present embodiment, the curvature of the sagittal refers to the curvature as defined in the plane which is perpendicular to the main-scan section and which contains a normal to the anamorphic surface at an arbitrary position in the meridional direction. In other words, the curvature of the sagittal is the curvature as defined in a plane which is perpendicular to the main-scan section and which contains a line perpendicular to a tangent line of the meridional shape at an arbitrary position in the meridional direction.

On the other hand, the curvature of the meridional refers to the curvature in main-scan section at an arbitrary position in the meridional direction.

Furthermore, in the present embodiment, when the Abbe's number of the material of the fourth lens G4 is denoted by ν4, a condition $$45 < \nu 4 < 65 \quad (1)$$

is satisfied.

By satisfying this condition, color drift (misregistration) in the sub-scan direction at positions along the meridional direction is diminished.

More preferably, the abovementioned conditional expression (1) had better be set as follows.

$$50 < \nu 4 < 60 \quad (1a)$$

Next, Numerical example 1-3 of the present invention will be explained.

Table 1, Table 3 and Table 5 shows the lens shape according to Numerical Examples 1, 2 and 3. Denoted in Table 1, Table 3 and Table 5 at f is the focal length of the image reading lens LG, and denoted at $F_{no}$ is the F number. Denoted at m is the magnification, and denoted at Y is the largest image height. Denoted at ω is the half field angle.

Furthermore, in the image reading lens LG shown in Table 1, Table 3 and Table 5, the surface number i is the ordinal number of each surface in the order from the original surface P. Also, denoted at $R_i$ is the curvature radius of the surfaces, and denoted at $D_i$ is the material thickness or air spacing between the "i"th surface and the "i+1"th surface. Denoted at $N_{di}$ and $\nu_{di}$ are the refractive index and the Abbe's number with reference to d line.

The anamorphic surface has such aspherical shape as defined by using coefficients shown in Table 2, Table 4 and Table 6 in Numerical Examples 1, 2 and 3.

With respect to the optical axis of the image reading lens, the aspheric shape having a rotationally asymmetric refracting power is as follows:

If the point of intersection between the lens surface and the optical axis is taken as an origin, the optical axis direction is taken as x-axis, an axis orthogonal to the optical axis in the main-scan section is taken as y-axis, and an axis orthogonal to the optical axis in the sub-scan section is taken as z-axis, then the meridional shape X is expressed by $$X = \frac{\frac{y^2}{R}}{1 + \sqrt{1 - (1 + k_y)\left(\frac{y}{R}\right)^2}} + B_4 y^4 + B_6 y^6 + B_8 y^8 + B_{10} y^{10}$$

wherein R is the curvature radius, and ky, B4, B6, B8 and B10 are aspherical coefficients.

The sagittal shape S is expressed by the following equations, while taking a plane on the meridional and being perpendicular to the meridional as the section.

$$S = \frac{\frac{z^2}{r'}}{1+\sqrt{1-(1+K_z)\left(\frac{z}{r'}\right)^2}} + D_4 z^4 + D_6 z^6 + D_8 y^8 + D_{10} z^{10}$$

$$r' = r_0(E_2 y^2 + E_4 y^4 + E_6 y^6 + E_8 y^8 + E_{10} y^{10})$$

wherein r0 is the curvature radius of the sagittal on the optical axis, and R=r0, and D2, D4, D6, D8, D10, E2, E4, E6, E8 and E10 are aspherical coefficients.

NUMERICAL EXAMPLE 1

TABLE 1

| | | | | | |
|---|---|---|---|---|---|
| | | f = 32.9 Fno = 6.5 m = 0.189 | | | |
| | | Y = 108 ω = 27.5 | | | |
| | Surface No. i | R | D | Nd | vd |
| C1 | C1 | infinite | 3.000 | 1.516 | 64.140 |
| | C2 | infinite | | | |
| G1 | 1 | 10.798 | 3.367 | 1.697 | 55.530 |
| | 2 | 22.980 | 1.140 | | |
| S | 3 | infinite (stop) | 0.417 | | |
| G2 | 4 | −33.062 | 0.844 | 1.689 | 31.070 |
| | 5 | 12.104 | 0.406 | | |
| G3 | 6 | 21.425 | 4.755 | 1.786 | 44.200 |
| | 7 | −21.425 | 3.600 | | |
| G4 anamorphic | 8* | −13.051 | 1.855 | 1.530 | 55.800 |
| | 9* | −15.217 | | | |
| C2 | C1 | infinite | 0.700 | 1.516 | 64.140 |
| | C2 | infinite | | | |

TABLE 2

| | 8th Surface | 9th Surface |
|---|---|---|
| R | −1.305E+01 | −1.522E+01 |
| ky | −6.556E+00 | −3.950E+00 |
| B4 | −3.964E−04 | −1469E−04 |
| B6 | 1.011E−06 | −1.644E−06 |
| B8 | −6.217E−08 | 3.185E−09 |
| B10 | 7.351E−10 | −3.429E−11 |
| Kz | −6.556E+00 | −3.950E+00 |
| D4 | −3.964E−04 | −1.469E−04 |
| D6 | 1.011E−06 | −1.644E−06 |
| D8 | −6.217E−08 | 3.185E−09 |
| D10 | 7.351E−10 | −3.429E−11 |
| r | −1.305E+01 | −1.522E+01 |
| E2 | 4.790E−03 | 6.799E−03 |
| E4 | −6.606E−04 | −4.661E−04 |
| E6 | 1.638E−05 | 6.402E−06 |
| E8 | −3.672E−07 | −1.093E−07 |
| E10 | 6.724E−09 | 1.808E−09 |

NUMERICAL EXAMPLE 2

TABLE 3

| | | | | | |
|---|---|---|---|---|---|
| | | f = 34.2 Fno = 5.5 m = 0.124 | | | |
| | | Y = 108 ω = 26.2 | | | |
| | Surface No. i | R | D | Nd | vd |
| C1 | C1 | infinite | 2.900 | 1.516 | 64.140 |
| | C2 | infinite | | | |
| G1 | 1 | 8.738 | 4.090 | 1.697 | 55.530 |
| | 2 | 17.564 | 0.303 | | |

TABLE 3-continued

| | | | | | |
|---|---|---|---|---|---|
| | | f = 34.2 Fno = 5.5 m = 0.124 | | | |
| | | Y = 108 ω = 26.2 | | | |
| | Surface No. i | R | D | Nd | vd |
| S | 3 | infinite (stop) | 0.288 | | |
| G2 | 4 | −21.224 | 0.800 | 1.689 | 31.070 |
| | 5 | 9.183 | 0.219 | | |
| G3 | 6 | 15.933 | 2.520 | 1.786 | 44.200 |
| | 7 | −15.933 | 3.580 | | |
| G4 anamorphic | 8* | −16.473 | 2.540 | 1.530 | 55.800 |
| | 9* | −15.479 | | | |
| C2 | C1 | infinite | 0.700 | 1.516 | 64.140 |
| | C2 | infinite | | | |

TABLE 4

| | 8th Surface | 9th Surface |
|---|---|---|
| R | −1.647E+01 | −1.548E+01 |
| ky | −1.849E+01 | −3.678E+00 |
| B4 | −5.271E−04 | −1.437E−04 |
| B6 | −4.644E−06 | −7.176E−06 |
| B8 | 2.538E−07 | 1.121E−07 |
| B10 | −1.408E−09 | −9.097E−10 |
| Kz | −1.849E+01 | −3.678E+00 |
| D4 | −5.271E−04 | −1.437E−04 |
| D6 | −4.644E−06 | −7.176E−06 |
| D8 | 2.538E−07 | 1.121E−07 |
| D10 | −1.408E−09 | −9.097E−10 |
| r | −1.647E+01 | −1.548E+01 |
| E2 | −1.095E−02 | −1.037E−03 |
| E4 | 5.490E−04 | −2.666E−04 |
| E6 | −7.879E−05 | 9.014E−06 |
| E8 | 2.243E−06 | −1.022E−06 |
| E10 | 2.723E−08 | 2.639E−08 |

NUMERICAL EXAMPLE 3

TABLE 5

| | | | | | |
|---|---|---|---|---|---|
| | | f = 24.3 Fno = 5 m = 0.124 | | | |
| | | Y = 108 ω = 26.2 | | | |
| | Surface No. i | R | D | Nd | vd |
| C1 | C1 | infinite | 3.000 | 1.516 | 64.140 |
| | C2 | infinite | | | |
| G1 | 1 | 8.608 | 3.715 | 1.697 | 55.530 |
| | 2 | 17.666 | 0.425 | | |
| S | 3 | infinite (stop) | 0.360 | | |
| G2 | 4 | −22.695 | 0.846 | 1.689 | 31.070 |
| | 5 | 8.991 | 0.271 | | |
| G3 | 6 | 16.255 | 2.590 | 1.786 | 44.200 |
| | 7 | −16.255 | 3.778 | | |
| G4 anamorphic | 8* | −14.164 | 2.026 | 1.530 | 55.800 |
| | 9* | −13.438 | | | |
| C2 | C1 | infinite | 0.700 | 1.516 | 64.140 |
| | C2 | infinite | | | |

TABLE 6

| | 8th Surface | 9th Surface |
|---|---|---|
| R | −1.416E+01 | −1.344E+01 |
| ky | −1.186E+01 | −2.181E+00 |
| B4 | −5.582E−04 | −1.448E−04 |
| B6 | −9.898E−07 | −6.752E−06 |

TABLE 6-continued

|  | 8th Surface | 9th Surface |
|---|---|---|
| B8 | 3.649E−08 | 6.744E−08 |
| B10 | 3.289E−09 | 0.000E+00 |
| Kz | −1.186E+01 | −2.181E+00 |
| D4 | −5.582E−04 | −1.448E−04 |
| D6 | −9.898E−07 | −6.752E−06 |
| D8 | 3.649E−08 | 6.744E−08 |
| D10 | 3.289E−09 | 0.000E+00 |
| r | −1.416E+01 | −1.344E+01 |
| E2 | −7.591E−03 | 4.155E−04 |
| E4 | 5.590E−04 | −3.695E−04 |
| E6 | −9.705E−05 | 1.125E−05 |
| E8 | 3.899E−06 | −9.478E−07 |
| E10 | −1.492E−08 | 2.589E−08 |

Next, an image reading apparatus having an image reading lens LG according to the present embodiment will be explained.

The fourth lens G4 of the image reading lens LG comprises an anamorphic lens.

Here:

N is the refractive index of the material of the anamorphic lens;

$r_{in}$ is the curvature radius, in a direction perpendicular to the main-scan section, at the position where the principal ray passes through the light entrance surface (first surface) of the anamorphic lens;

$r_{out}$ is the curvature radius, in a direction perpendicular to the main-scan section, at the position where the principal ray passes through the light exit surface (second surface) of the anamorphic lens;

d is the distance in the optical axis direction between the positions where the principal ray passes through the light entrance surface (first surface) and the light exit surface (second surface) of the anamorphic lens; and ω is the largest half field angle of the image reading lens.

It is to be noted that the half field angle ω depends on the effective length of the photoelectric conversion element Q in the main-scan direction and the focal length of the image reading lens LG.

Now, constants A and B expressed by the following equations are used.

$$A = \frac{N-1}{r_{in}}\left(1 - \frac{1}{r_{out}}\left(r_{in} - \frac{d(N-1)}{N}\right)\right)$$

$$B = 1 - \frac{d(N-1)}{Nr_{in}}$$

When $A_{on}$ and $B_{on}$ denote the numerical values of the constants A and B concerning the principal ray of the axial light, and $A_{off}$ and $B_{off}$ denote the numerical values of the constants A and B concerning the principal ray of the most abaxial light, the following conditional expressions are satisfied.

$$0.8 < \frac{A_{off}}{A_{on}\cos\omega} < 1.2 \tag{2}$$

$$\left|1 - \frac{A_{off}}{A_{on}\cos\omega}\right| + \left|1 - \frac{B_{off}}{B_{on}\cos\omega}\right| < 0.2 \tag{3}$$

By satisfying conditional expressions (2) and (3), the magnification error in the sub-scan direction at positions along the meridional direction of the anamorphic surface is reduced well.

More preferably, the abovementioned conditional expressions (2) and (3) had better be set as follows.

$$0.9 < \frac{A_{off}}{A_{on}\cos\omega} < 1.1 \tag{2a}$$

$$0.05 < \left|1 - \frac{A_{off}}{A_{on}\cos\omega}\right| + \left|1 - \frac{B_{off}}{B_{on}\cos\omega}\right| < 0.15 \tag{3a}$$

Furthermore, if $A_{mid}$ denotes a numerical value of the constant A concerning the principal ray of the 70% field-angle light beam with respect to the most abaxial ray, the following condition is satisfied.

$$0 < \frac{7A_{on} + 3A_{off} - 10A_{mid}}{10|A_{on}|} < 0.4 \tag{4}$$

The conditional expression (4) is a condition for well correcting the field curvature aberration, more specifically, the field curvature aberration in the sub-scan direction of the image reading apparatus, over the whole field angle region including an intermediate field angle. If the numerical lower limit or upper limit is unsatisfied, not only the field curvature correction becomes excessive but also the sub-scan magnification deteriorates.

More preferably, the numerical value range of the conditional expression (4) had better be set as follows.

$$0.05 < \frac{7A_{on} + 3A_{off} - 10A_{mid}}{10|A_{on}|} < 0.35 \tag{4a}$$

Furthermore, $R_{in}$ denotes the radius of curvature in the main-scan section at the position where the principal ray passes through the light entrance surface (first surface) of the anamorphic lens. Also, $R_{out}$ denotes the curvature radius in the main-scan section at the position where the principal ray passes through the light exit surface (second surface) of the anamorphic lens. A constant C which is expressed as follows is used.

$$C = \frac{N-1}{R_{in}}\left(1 - \frac{1}{R_{out}}\left(r_{in} - \frac{d(N-1)}{N}\right)\right)$$

Also, $C_{on}$, $C_{mid}$ and $C_{off}$ denote the numerical values concerning the principal rays of the axial light, 70% field-angle light and most abaxial light, respectively. Here, the following condition is satisfied.

$$0.1 < \frac{7C_{on} + 3C_{off} - 10C_{mid}}{10(C_{off} - C_{on})} < 0.7 \tag{5}$$

The conditional expression (5) is a condition for well correcting the field curvature aberration, particularly, the field curvature aberration with respect to the main-scan direction of the image reading apparatus, over the whole field angle region including an intermediate field angle. If the numerical lower limit or upper limit is unsatisfied, the field curvature correction deteriorates.

More preferably, the numerical value range of the conditional expression (5) had better be set as follows.

$$0.2 < \frac{7C_{on} + 3C_{off} - 10C_{mid}}{10(C_{off} - C_{on})} < 0.6 \quad (5a)$$

NUMERICAL EXAMPLE 1

The image reading lens LG of Numerical Example 1 has an F number 6.5 which is necessary and sufficient for use in an image scanner. As shown in FIG. 2, aberrations from the axial point to the abaxial point are reduced enough, and high imaging performance is obtained.

As for the line sensor (CCD) to be used in combination, anyone may be used provided that the magnification is 0.189×. The numerical values of conditional expressions (1)-(5) are shown in Table 7 below. All these values satisfy corresponding conditional expressions (1)-(5).

Here, even if a CCD for 2400 dpi having different color sensors of R-G and G-B with a sensor array spacing of 96 μm and a pixel size of 2 μm, is used, it has been confirmed by the ray tracing simulation that the color drift due to the error of the sub-scan magnification is around 0.6 pixel. It is sufficiently good performance.

NUMERICAL EXAMPLE 2

The image reading lens LG of Numerical Example 2 has an F number 5.5 which is necessary and sufficient for use in a digital copying machine. As shown in FIG. 4, aberrations from the axial point to the abaxial point are reduced enough, and high imaging performance is obtained.

As for the line sensor (CCD) to be used in combination, anyone may be used provided that the magnification is 0.124×. The numerical values of conditional expressions (1)-(5) are shown in Table 7 below. All these values satisfy corresponding conditional expressions (1)-(5).

Here, even if a CCD for 600 dpi having different color sensors of R-G and G-B with a sensor array spacing of 63 μm and a pixel size of 5.25 μm, is used, it has been confirmed by the ray tracing simulation that the color drift due to the error of the sub-scan magnification is around 0.3 pixel. It is sufficiently good performance.

NUMERICAL EXAMPLE 3

The image reading lens LG of Numerical Example 3 has an F number 5.0 which is necessary and sufficient for use in a digital copying machine. As shown in FIG. 6, aberrations from the axial point to the abaxial point are reduced enough, and high imaging performance is obtained.

As for the line sensor (CCD) to be used in combination, anyone may be used provided that the magnification is 0.124×. The numerical values of conditional expressions (1)-(5) are shown in Table 7 below. All these values satisfy corresponding conditional expressions (1)-(5).

Here, even if a CCD for 1200 dpi having different color sensors of R-G and G-B with a sensor array spacing of 63 μm and a pixel size of 2.625 μm, is used, it has been confirmed by the ray tracing simulation that the color drift due to the error of the sub-scan magnification is around 0.4 pixel. It is sufficiently good performance.

Now, Table 7 shows the relationship between the abovementioned conditional expressions (1)-(5) and the numerical values of Numerical Examples 1-3.

The image reading lens of any of these numerical examples has a high imaging performance as described, yet it has a super wide field angle. The optical path length from the original surface to the line sensor is about 250 mm, and this is suitable for use as a small carriage or an image reading apparatus.

TABLE 7

| Numerical Example | Condition (1) | Condition (2) | Condition (3) | Condition (4) | Condition (5) |
|---|---|---|---|---|---|
| 1 | 55.8 | 0.98 | 0.11 | 0.12 | 0.49 |
| 2 | 55.8 | 1.05 | 0.07 | 0.27 | 0.36 |
| 3 | 55.8 | 1.02 | 0.09 | 0.24 | 0.35 |

As described above, in this embodiment, both of the light entrance surface and the light exit surface of the fourth lens G4 are provided by an anamorphic surface. Then, by satisfying the abovementioned conditional expressions (1)-(5), both of the field curvature aberration and the magnification error in the sub-scan direction are reduced well.

Furthermore, by satisfying conditional expressions (1)-(5), excessive correction of the field curvature aberration by the anamorphic lens is prevented. If it is corrected excessively, even though the field curvature aberration is compensated sufficiently, the sub-scan magnification extremely deteriorates. Thus, it is not good as the image reading lens.

Furthermore, when conditional expressions (1)-(5) are satisfied, a yardstick value will be provided for discriminating whether the design is good o not, without the necessity of ray tracing simulation. Therefore, not only the design performance can be improved but also the designing steps can be reduced.

Furthermore, the present embodiment achieves an image reading lens of wide field angle and high image quality, yet the lens structure is quite simple as having only four lenses.

In addition, with the present embodiment, an image reading lens by which a large light quantity is kept at the abaxial point is realized.

[Flatbed Type Image Reading Apparatus]

Figure 8:
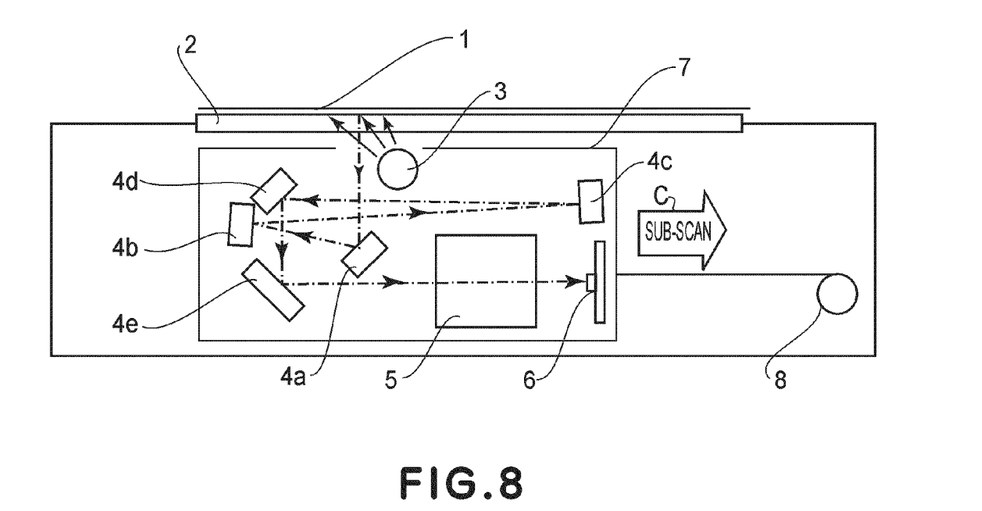
FIG. 8 is a schematic diagram of a main portion of an image reading apparatus according to the present invention.

FIG. 8 is schematic diagram of a main portion of a carriage-integrated type (flatbed type) image reading apparatus such as a digital copying machine, for example, into which an image reading lens according to any one of Numerical Examples 1, 2 and 3 of the present invention is incorporated.

In the present embodiment, a light beam from an illumination system 3 illuminates an original 1 directly or by way of a reflector (not shown). Reflected light from the illuminated original 1 is reflected by first, second, third, fourth and fifth reflection mirrors 4a, 4b, 4c, 4d and 4e, and the light path of the light beam is bent inside the carriage 7.

The light beam thus deflected is imaged upon the surface of a CCD 6 as reading means, by an image reading lens 5 according to any one of Numerical Examples 1, 2 and 3 described hereinbefore. The imagewise information of the original 1 is read by moving the carriage 7 in the direction of an arrow C (sub-scan direction) by means of a sub-scan mechanism 8. The thus read imagewise information is sent to a personal computer or the like which is an external equipment, through an interface (not shown).

With the use of the imaging lens 5 according to any one of Numerical Examples 1, 2 and 3 described hereinbefore, an image reading apparatus of super small size and superior image quality is accomplished.

It is to be noted that the present invention is not limited to such integral type (flatbed type) image reading apparatus. The invention can be applied to an image reading apparatus having a 1:2 scan optical system such as shown in FIG. 9, for example, essentially in the same manner as has been described above.

Figure 9:
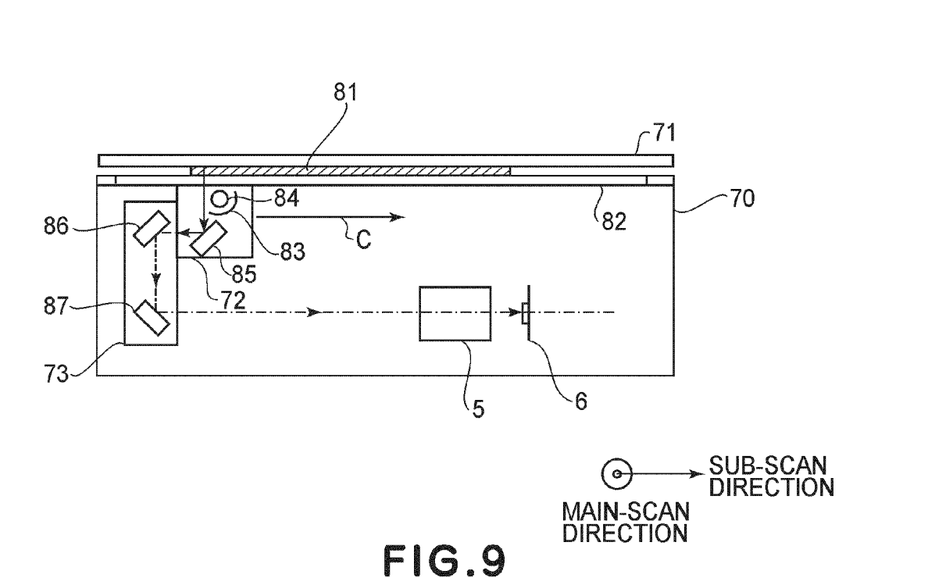
FIG. 9 is a schematic diagram of a main portion of an image reading apparatus according to the present invention.

More specifically, in FIG. 9, denoted at 82 is original table (original table glass), and an original 81 is put on the surface thereof. Denoted at 84 is an illumination light which comprises a halogen lamp, a fluorescent lamp or a xenon lamp, for example. Denoted at 83 is a reflector which functions to reflect the light beam from the illumination light source 84 to illuminate the original efficiently. Denoted at 85, 86 and 87 are first, second and third reflecting mirrors, in this order, which function to bend the light path of the light beam from the original 81, inside the main frame.

Denoted at 5 is an image reading lens according to any one of Numerical Examples 1, 2 and 3, and it functions to image the light beam based on the imagewise information of original 81, on the surface of a photoelectric conversion element. Denoted at 6 is a line sensor (CCD) as the photoelectric conversion element. Denoted at 70 is the main frame, and denoted at 71 is a platen. Denoted at 72 is a first mirror table, and denoted at 73 is a second mirror table.

In FIG. 9, a light beam from an illumination system 84 illuminates an original 81 directly or by way of a reflector 83. Reflected light from the illuminated original 81 is reflected by first, second and third reflection mirrors 85, 86 and 87, and the light path of the light beam is bent inside the main frame 70.

Here, electric scan along the main-scan direction is carried out while the first, second, and third reflecting mirrors 85, 86 and 87 move in the sub-scan direction, by which imagewise information of the original 81 is read. The movement amount of the second and third reflection mirrors 86 and 87 is a half of the movement amount of the first reflecting mirror 85. By this, the distance between the original 81 and the CCD 6 is kept constant.

Although in this embodiment the imaging optical system of the present invention is incorporated into an image reading apparatus for a digital color copying machine, the present invention is not limited to this. The present invention is applicable also to various color image reading apparatuses such as a color image scanner, for example.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-245440 filed Sep. 11, 2006, for which is hereby incorporated by reference.

What is claimed is:

1. An image reading apparatus, comprising:
a photoelectric conversion element having picture elements arrayed in a main-scan direction; and
an image reading lens for imaging imagewise information on a surface of an original, upon a light receiving surface of said photoelectric conversion element,
wherein said image reading lens includes at least one anamorphic lens having anamorphic surfaces formed at a light entrance surface and a light exist surface thereof, respectively,
wherein, when a sectional shape of the anamorphic surface in a main-scan section which contains an optical axis of said image reading lens and the main-scan direction, is taken as a meridional, a curvature of a sagittal of the anamorphic surface defined within a plane being perpendicular to the main-scan section and containing a normal to the anamorphic surface at an arbitrary position in the meridional direction, changes continuously along the meridional direction from the optical axis,
wherein, when N is a refractive index of a material of the anamorphic lens, $r_{in}$ is a curvature radius of the sagittal at a position where a principal ray passes through the light entrance surface of the anamorphic lens, $r_{out}$ is a curvature radius of the sagittal in a direction perpendicular to the main-scan section and at a position where the principal ray passes through the light exit surface of the anamorphic lens, d is a distance in the optical axis direction between the positions where the principal ray passes the light entrance surface and the light exit surface of the anamorphic lens, respectively, ω is a largest half field angle of said image reading lens, and when constants A and B expressed by $$A = \frac{N-1}{r_{in}}\left(1 - \frac{1}{r_{out}}\left(r_{in} - \frac{d(N-1)}{N}\right)\right)$$

$$B = 1 - \frac{d(N-1)}{Nr_{in}}$$

are used, then conditions expressed by $$0.8 < \frac{A_{off}}{A_{on}\cos\omega} < 1.2$$

$$\left|1 - \frac{A_{off}}{A_{on}\cos\omega}\right| + \left|1 - \frac{B_{off}}{B_{on}\cos\omega}\right| < 0.2$$

are satisfied, where $A_{on}$ and $B_{on}$ are values of the constants A and B concerning a principal ray of abaxial light, respectively, and $A_{off}$ and $B_{off}$ are values of the constants A and B concerning a principal ray of most abaxial light, respectively.

2. An image reading apparatus according to claim 1, wherein, when $A_{mid}$ is a value of the constant A concerning a principal ray of 70% filed-angle light with respect to the most abaxial light, a relation $$0 < \frac{7A_{on} + 3A_{off} - 10A_{mid}}{10|A_{on}|} < 0.4$$

is satisfied.

3. An image reading apparatus according to claim 1, wherein, when $R_{in}$ is a curvature radius of the meridional at the position where the principal ray passes through the light entrance surface of the anamorphic lens, $R_{out}$ is a curvature radius of the meridional at the position where the principal ray passes through the light exit surface of the anamorphic lens, a constant C expressed by $$C = \frac{N-1}{R_{in}}\left(1 - \frac{1}{R_{out}}\left(R_{in} - \frac{d(N-1)}{N}\right)\right)$$

is used, and when $C_{on}$, $C_{mid}$ and $C_{off}$ are values concerning principal rays of the axial light, 70% field-angle light and most abaxial light, respectively, a relation $$0.1 < \frac{7C_{on} + 3C_{off} - 10C_{mid}}{10(C_{off} - C_{on})} < 0.7$$

is satisfied.

4. An image reading apparatus according to claim 1, wherein the curvature radius of the meridional and the curvature radius of the sagittal of said image reading lens, on the optical axis of said image reading lens, are equal to each other.

5. An image reading apparatus according to claim 1, wherein said image reading lens includes, in an order from the surface of the original to the photoelectric conversion element side, a first lens of positive refracting power having a meniscus shape with a convex surface facing the original side, a second lens with biconcave lens surfaces, a third lens with biconvex lens surfaces, and a fourth lens having a meniscus shape with a convex surface facing the photoelectric conversion element side, and wherein said fourth lens is the anamorphic lens.

6. An image reading apparatus according to claim 1, wherein said image reading lens has a vignetting factor which is not less than 95% over the whole field angle.

* * * * *

UNITED STATES PATENT AND TRADEMARK OFFICE
CERTIFICATE OF CORRECTION

| | | |
|---|---|---|
| PATENT NO. | : 7,397,620 B2 | |
| APPLICATION NO. | : 11/849787 | |
| DATED | : July 8, 2008 | |
| INVENTOR(S) | : Tadao Hayashide et al. | |

It is certified that error appears in the above-identified patent and that said Letters Patent is hereby corrected as shown below:

<u>ON THE TITLE PAGE, AT ITEM [57], ABSTRACT</u>
    Line 10, "exist" should read --exit--.

<u>COLUMN 1</u>
    Line 9, "suitable" should read --suitably--.
    Line 19, "denote" should read --denoted--.

<u>COLUMN 2</u>
    Line 9, "avoiding" should read --avoid--.
    Line 52, "reducing" should read --reduce--.

<u>COLUMN 3</u>
    Line 5, "exist" should read --exit--.
    Line 51, "filed-angle" should read --field-angle--.

<u>COLUMN 5</u>
    Line 45, "Of with" should read --with--.

<u>COLUMN 6</u>
    Line 26, "example" should read --Examples--.
    Line 28, "shows" should read --show--.

<u>COLUMN 7</u>
    Line 41, "-1469E-04" should read -- -1.469E-04--.

<u>COLUMN 11</u>
    Line 20, "anyone" should read --any one--.
    Line 39, "anyone" should read --any one--.
    Line 58, "anyone" should read --any one--.

UNITED STATES PATENT AND TRADEMARK OFFICE
CERTIFICATE OF CORRECTION

PATENT NO. : 7,397,620 B2
APPLICATION NO. : 11/849787
DATED : July 8, 2008
INVENTOR(S) : Tadao Hayashide et al.

It is certified that error appears in the above-identified patent and that said Letters Patent is hereby corrected as shown below:

COLUMN 12
       Line 33, "o not" should read --or not--.

COLUMN 13
       Line 52, "for" should be deleted.
       Line 63, "exist" should read --exit--.

COLUMN 14
       Line 43, "filed-angle" should read --field-angle--.

Signed and Sealed this

Sixteenth Day of December, 2008

JON W. DUDAS
*Director of the United States Patent and Trademark Office*